United States Patent Office 3,576,917
Patented Apr. 27, 1971

3,576,917
PENTAERYTHRITOL PHOSPHITES CONTAINING MORE THAN TWO HYDROGENATED PHENOLIC GROUPS
Lester Friedman, Beachwood, Ohio, assignor to Weston Chemical Corporation, New York, N.Y.
No Drawing. Filed Aug. 2, 1968, Ser. No. 749,610
Int. Cl. C07f 9/16
U.S. Cl. 260—927                15 Claims

ABSTRACT OF THE DISCLOSURE

Compounds are prepared having one of the formulae (1)

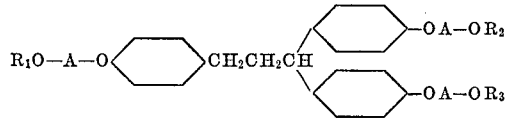

and (2)

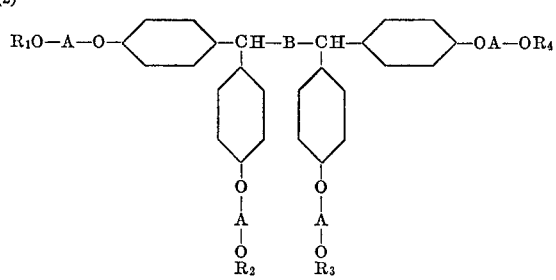

where A is

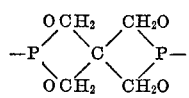

B is $(CH_2)_n$ or

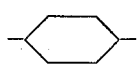

where $n$ is an integer from 0 to 10, $R_1$, $R_2$, $R_3$ and $R_4$ are alkyl, aryl, alkenyl, haloaryl or the monovalent residue of a dihydric phenol or hydrogenated dihydric phenol. Preferably at least one of the R groups, and most preferably all of the R groups are residues of hydrogenated dihydric phenols.

The compounds are useful as stabilizers for halogen containing polymers, hydrocarbon polymers hydrocarbon oils foodstuffs. Those compounds having free hydroxyl groups can be used as reactive stabilizers for polyurethanes and polyesters.

---

The present invention relates to novel phosphites.

It is an object of the present invention to prepare novel phosphites.

Another object is to develop novel stabilizers for hydrocarbon polymers, halogen containing polymers, natural and synthetic rubbers and other polymers.

A more specific object is to prepare stabilizers for rigid polyvinyl chloride resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications become apparent to those skilled in the art from the detailed description.

It has now been found that these objects can be attained by preparing phosphites having one of the formulae (1)

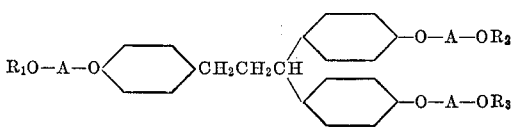

and (2)

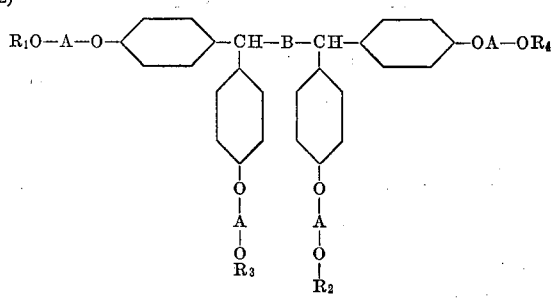

where A is

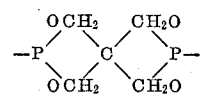

B is $(CH_2)_n$ or

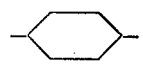

where $n$ is zero or an integer from 0 to 10, $R_1$, $R_2$, $R_3$ and $R_4$ are alkyl, aryl, alkenyl, haloaryl or the monovalent residue of a dihydric phenol or hydrogenated dihydric phenol. Preferably at least one of the R groups, and most preferably all of the R groups are residues of hydrogenated dihydric phenols.

The compounds are useful as high molecular weight stabilizers for halogen containing resins such as vinyl chloride resins, hydrocarbon polymers such as monoolefin polymers including polypropylene, polyethylene, ethylene-propylene copolymers and terpolymers, natural rubber, synthetic rubbers, e.g. cis isoprene polymer, butadiene-styrene copolymer (SBR rubber) and rubbery and resinous acrylonitrile-butadiene-styrene copolymers. They are also useful for stabilizing hydrocarbon oils and foodstuffs. The compounds having free hydroxyl groups can be used as a reactant in making polyurethanes and polyesters. They also impart heat and light stability to such polymers.

The compounds having hydrogenated dihydric phenol residues and particularly those having residue of hydrogenated Bisphenol A are excellent stabilizers for rigid polyvinyl chloride resins.

As used in the present specification and claims the symbol

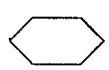

represents the carbocyclic benzene ring and the symbol

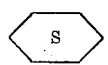

indicated that the ring is completely saturated.

The compounds of the present invention are prepared by reaction of a compound having one of the formulae (3)
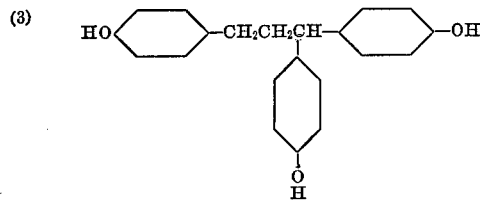

and (4)
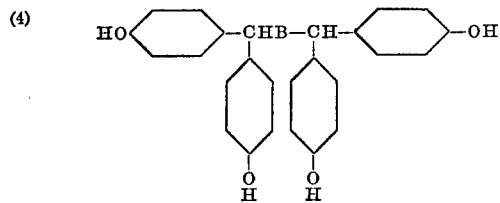

where B is (CH₂)ₙ or

and $n$ is an integer from 0 to 10 with a compound having the formula (5)
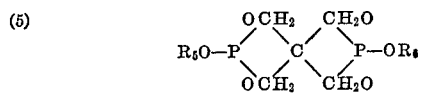

where $R_5$ and $R_6$ are alkyl, phenyl, alkylphenyl, halophenyl or chloroalkylphenyl. To make derivatives of higher alcohol or phenols or dihydric phenols or hydrogenated dihydric phenols the reaction product of compound 5 with either compound (3) or (4) having residues of low boiling alcohol or phenol residues as $R_5$ and $R_6$ (i.e. compound 1 or 2) is reacted with a high boiling alcohol, phenol or dihydric phenol or hydrogenated dihydric phenol to form the compounds of Formulae 1 and 2 containing the residues of the high boiling compounds.

To make the compounds of Formula 1 there is reacted 1 mole of a compound of Formula 3 with (a) 3 moles of a compound of Formula 5 and there are removed 3 moles of $R_5OH$ and $R_6OH$ or (b) with 3 moles of a compound of Formula 5 and then with 3 moles of a dihydric phenol, hydrogenated dihydric phenol or monohydric phenol or alcohol boiling higher than the $R_5OH$ and $R_6OH$ compounds and removing 6 moles total of $R_5OH$ and $R_6OH$. Mixed phosphites are prepared in (a) if $R_5$ and $R_6$ are different. Mixed phosphites are prepared in reaction (b) if 1 mole but less than 3 moles of the dihydric phenol, hydrogenated dihydric phenol, higher boiling alcohol or higher boiling monohydric phenol are employed.

It is critical that at least 3 moles of the compound of Formula 5 be used since if significantly less than 3 moles are used for each mole of compound of Formula 3 then different products are obtained.

The compounds of Formula 2 are made in similar fashion with appropriate adjustment of proportions. Thus the compounds of Formula 2 are prepared by reacting 1 mole of a compound of Formula 4 with either (a) 4 moles of a compound of Formula 5 and the removal of 4 moles of $R_5OH$ and $R_6OH$ or (b) with 4 moles of a compound of Formula 5 and then with 4 moles of a dihydric phenol, hydrogenated dihydric phenol or monohydric phenol or alcohol boiling higher than the $R_5OH$ and $R_6OH$ compounds and removing 8 moles total of $R_5OH$ and $R_6OH$. Mixed phosphites are prepared in (a) if $R_5$ and $R_6$ are different. Mixed phosphites are prepared in reaction (b) if 1 mole but less than 4 moles of the dihydric phenol, hydrogenated dihydric phenol, higher boiling alcohol or monohydric phenol are employed.

It is critical that at least 4 moles of the compound of Formula 5 be used since if significantly less than 4 moles are used for each mole of compound of Formula 4 then different products are obtained.

The starting compounds of Formulae 3 and 4 are known compounds and are readily available. Thus the compound of Formula 3 is prepared from 1 mole of acrolein and 3 moles of phenol while the compound of Formula 4 are made from 1 mole of the appropriate dialdehyde such as glyoxal, succinaldehyde, glutaraldehyde, adipaldehyde, sebacaldehyde, suberaldehyde, terephthaldehyde, or 1,10-decanedialdehyde with 4 moles of phenol. The compounds of Formulae 3 and 4 include 1,1,3-tri(4-hydroxyphenyl) propane, 1,1,2,2-tetra (4-hydroxyphenyl) ethane, 1,1,4,4-tetra (4-hydroxyphenyl) butane, 1,1,5,5-tetra (4-hydroxyphenyl) pentane, 1,1,6,6-tetra (4-hydroxyphenyl) hexane, 1,1,7,7-tetra (4-hydroxyphenyl) heptane, 1,1,8,8-tetra (4-hydroxyphenyl) octane, 1,1,10,10-tetra (4-hydroxyphenyl) decane, 1,1,12,12-tetra (4-hydroxyphenyl) dodecane, 1 - (di(4' - hydroxyphenyl)) methyl-4-di(4'-hydroxyphenyl)) methyl benzene.

As compounds having Formula 5 there can be used diphenyl pentaerythritol diphosphite, di p-cresyl pentaerythritol diphosphite, di (2-chloropropyl) pentaerythritol diphosphite didecyl pentaerythritol diphosphite, di (isodecyl) pentaerythritol diphosphite, dimethyl pentaerythritol diphosphite, diallyl pentaerythritol diphosphite, di (p-chlorophenyl) pentaerythritol diphosphite as well as the analogous materials set forth in Friedman Pat. 2,047,608 and 3,053,878, Gould Pat. 2,961,454 and Hechenbleikner Pat. 2,847,443.

Starting alcohols and phenols include methyl alcohol, ethyl alcohol, isopropyl alcohol, butyl alcohol, sec. amyl alcohol, cyclohexyl alcohol, hexyl alcohol, octyl alcohol, isooctyl alcohol, decyl alcohol, isodecyl alcohol, dodecyl alcohol, hexadecyl alcohol, octadecyl alcohol, eicosanyl alcohol, allyl alcohol, crotyl alcohol, oleyl alcohol, linoleyl alcohol, phenol, o - cresol, p - cresol, m - cresol, 2,4-xylenol, 2,5-xylenol, 4 - butylphenol, p - t - amylphenol, 2-octylphenol, 4-decylphenol, 4-dodecylphenol, 4-octadecylphenol, 4-allylphenol, p-chlorophenol, p-fluorophenol, 2,4-dichlorophenol, pentachlorophenol, 4-bromophenol, p-nonylphenol, 2,4-dinonylphenol, Bisphenol A (2,2-bis (4-hydroxyphenyl) propane), di (4-hydroxyphenyl) methyl ethyl methane, di (4-hydroxyphenyl) methane, p,p-diphenol (bisphenol), bis (2-hydroxyphenyl) dimethyl methane, hydroquinone, di (3-methyl-4-hydroxyphenyl) dimethyl methane, di (3-methyl-4-hydroxyphenyl) methyl methane, di (3-methyl-4-hydroxyphenyl) phenyl methane, di (4-hydroxyphenyl) sulfone, di (4-hydroxyphenyl) sulfide, di (3-hydroxyphenyl) dimethyl methane, 4,4'-methylene bis (2-methyl-6-t-butylphenol), di (4-hydroxyphenyl) ether, resorcinol, di (3-chloro-4-hydroxyphenyl) dimethyl methane, tetrachloro Bisphenol A (di (dichlorohydroxyphenyl) dimethyl methane).

As used in the present specification and claims the term hydrogenated dihydric phenol signifies that all of the aromatic double bonds have been completely hydrogenated. Examples of hydrogenated dihydric phenols used to form the products of the present invention are 4,4'-isopropylidene dicyclohexanol (also called bis (4-hydroxycyclohexyl) dimethyl methane or hydrogenated Bisphenol A), di (4-hydroxycyclohexyl) methyl ethyl methane, di (4-hydroxycyclohexyl) methane, di (4-hydroxycyclohexyl), bis (2-hydroxycyclohexyl) dimethyl methane, 1,4-dihydroxycyclohexane, di (4-hydroxy-3-methyl-cyclohexyl) dimethyl methane, di (4-hydroxy-3-methylcyclohexyl) methyl methane, di (4-hydroxy-3-methylcyclohexyl) cyclohexyl methane, di (4-hydroxycyclohexyl) sulfone, di (4-hydroxycyclohexyl) sulfide, di (3-hydroxycyclohexyl) dimethyl methane, 4,4'-methylene bis (2-methyl-6-t-butylcyclohexanol), di (4-hydroxycyclohexyl) ether, 1,3-dihydroxycyclohexane, di (3-chloro-4-hydroxycyclohexyl) dimethyl methane.

While the above phosphite forming reaction can be carried out at atmospheric pressure or super atmospheric pressure they are preferably carried out in a vacuum, e.g.

0.1 to 100 mm. pressure, usually at 5–15 mm. pressure, at the boiling point of the monohydric alcohol or monohydric phenol which is being removed.

Unless otherwise indicated all parts and percentages are by weight.

The reactions set forth above are all preferably catalyzed with 0.1 to 5% based on the weight of the phosphite reactant or reactants of a catalyst which usually is a secondary phosphite, e.g. a dialkyl phosphite, a diaryl phosphite or a dihaloaryl phosphite or an alkaline catalyst. Examples of suitable catalysts are diphenyl phosphite, di(2-methylphenyl) phosphite, di(4-dodecylphenyl) phosphite, di(4 - octadecylphenyl) phosphite, di(2 - chlorophenyl)phosphite, di(2,4 - dimethylphenyl) phosphite, di(4 - bromophenyl) phosphite, diethyl phosphite, dicyclohexyl phosphite, phenyl 3 - methylphenyl phosphite, dioctadecyl phosphite, dimethyl phosphite, sodium phenolate, sodium decylate, potassium p - cresylate, sodium ethylate, sodium octadeconolate, sodium hydride, sodium metal, potassium metal, lithium methylate, sodium cetylate, trimethyl benzyl ammonium hydroxide and other quaternary ammonium hydroxides, sodium hydroxide, potassium hydroxide, calcium ethylate, sodium methylate, guanidines, eg. pentamethyl guanidine.

The compounds of the present invention within Formula 1 include tris(hydrogenated bisphenol A) triphenylpropane tris(pentaerythritol) hexaphosphite, bis(hydrogenated bisphenol A) phenyl triphenylpropane tris(pentaerythritol) hexaphosphite, hydrogenated bisphenol A bis (p-cresyl) triphenylpropane tris(pentaerythritol) hexaphosphite, bis(hydrogenated bisphenol A) isodecyl triphenylpropane tris(pentaerythritol)hexaphosphite, bis (hydrogenated bisphenol A) p-nonylphenol triphenylpropane tris(pentaerythritol) hexaphosphite, tris(di(4 - hydroxycyclohexyl) methyl ethyl methane) triphenylpropane tris(pentaerythritol hexaphosphite, tris(di(4-hydroxycyclohexyl) methane) triphenylpropane tris(pentaerythritol) hexaphosphite, tris(di(4 - hydroxycyclohexyl)) triphenylpropane tris(pentaerythritol) hexaphosphite, tris(bis(2 - hydroxycyclohexyl) dimethyl methane) triphenylpropane tris(pentaerythritol) hexaphosphite, tris (1,4-dihydroxycyclohexane) triphenylpropane tris(pentaerythritol) hexaphosphite, tris(di(4-hydroxy-3-methylcyclohexyl) dimethyl methane)) triphenylpropane tris (pentaerythritol)hexaphosphite, tris(di(4-hydroxycyclohexyl) sulfide) triphenylpropane tris(pentaerythritol) hexaphosphite, tris(di(4-hydroxycyclohexyl) ether) triphenylpropane tris(pentaerythritol) hexaphosphite, tris (di(3-chloro-4-hydroxy-cyclohexyl) dimethyl methane) triphenylpropane tris(pentaerythritol) hexaphosphite. tris(4,4'-methylene bis(2-methyl-6-t-butylcyclohexanol)) triphenylpropane tris(pentaerythritol) hexaphosphite, tris(phenyl) triphenylpropane tris(pentaerythritol) hexaphosphite, tris(p-nonylphenyl) triphenylpropane tris(pentaerythritol) hexaphosphite, phenyl bis(p-nonylphenyl) triphenylpropane tris(pentaerythritol) hexaphosphite, tris(2-methylphenyl) triphenylpropane tris(pentaerythritol) hexaphosphite, tris(stearyl) triphenylpropane tris (pentaerythritol) hexaphosphite, tris(eicosanyl) triphenylpropane tris(pentaerythritol) hexaphosphite, tris(oleyl) triphenylpropane tris(pentaerythritol) hexaphosphite, tris(cyclohexyl) triphenylpropane tris(pentaerythritol) hexaphosphite, tris(isodecyl) triphenylpropane tris(pentaerythritol) hexaphosphite, tris (p-dodecylphenyl) triphenylpropane tris(pentaerythritol) hexaphosphite, bis (stearyl) octyl triphenylpropane tris(pentaerythritol) hexaphosphite, tris(4-chlorophenyl) triphenylpropane tris(pentaerythritol) hexaphosphite, tris(2,4 - dichlorophenyl) triphenylpropane tris(pentaerythritol) hexaphosphite, tris(3-bromophenyl) triphenylpropane tris(pentaerythritol) hexaphosphite, tris(methyl) triphenylpropane tris(pentaerythritol) hexaphosphite, tris(2,4 - dinonylphenyl) triphenylpropane tris(pentaerythritol) hexaphosphite.

The compounds of the invention within Formula 2 include tetra (hydrogenated bisphenol A) tetraphenylethane tetra (pentaerythritol) octaphosphite, tetra (hydrogenated bisphonel A) tetrapenylbutane tetra (pentaerythritol) octaphosphite, tetra (hydrogenated bisphenol A) tetraphenylpentane tetra (pentaerythritol) octaphosphite, tetra (hydrogenated bisphenol A) tetraphenylhexane tetra (pentaerythritol) octaphosphite, tetra (hydrogenated bisphenol A) tetraphenyloctane tetra (pentaerythritol) octaphosphite, tetra (hydrogenated bisphenol A) tetraphenyldecane tetra (pentaerythritol) octaphosphite, tetra (hydrogenated bisphenol A) tetraphenyldodecane tetra (pentaerythritol) octaphosphite, bis (hydrogenated bisphenol A) bis (isodecyl) tetraphenylpentane tetra (pentaerythritol) octaphosphite, tris (hydrogenated bisphenol A) phenyl tetraphenylpentane tetra (pentaerythritol) octaphosphite, tetra (cyclohexyl) tetraphenylpentane tetra (pentaerythritol( octaphosphite, tetra (di (4-hydroxycyclohexyl) methyl ethyl methane) tetraphenylpentane tetra (pentaerythritol) octaphosphite, tetraphenylpentane tetra (pentaerythritol) octaphosphite, tetra (di (4-hydroxycyclohexyl) methane) tetraphenylpentane tetra (pentaerythritol) octaphosphite, tetra (1,4-dihydroxycyclohexane) tetraphenylpentane tetra (pentaerythritol) octaphosphite, tetra (di (4-hydroxy-3-methylcyclohexyl) dimethyl methane) tetraphenylpentane tetra (pentaerythritol) octaphosphite, tetra (di (4-hydroxycyclohexyl) ether) tetraphenylpentane tetra (pentaerythritol) octaphosphite, tetra (phenyl) tetraphenylpentane tetra (pentaerythritol) octaphosphite, tetra (p-nonylphenyl) tetraphenylpentane tetra (pentaerythritol) octaphosphite, tetra (p-methylphenyl) tetraphenylpentane tetra (pentaerythritol) octaphosphite, tetra (stearyl) tetraphenylpentane tetra (pentaerythritol) octaphosphite, tetra (oleyl) tetraphenylpentene tetra (pentaerythritol) octaphosphite, tetra (decyl) tetraphenylpentane tetra (pentaerythritol) octaphosphite, tetra (2-chlorophenyl) tetraphenylpentane tetra (pentaerythritol) octaphosphite, tetra (hydrogenated bisphenol A) tetraphenyl xylylene tetra (pentaerythritol) octaphosphite, tri (hydrogenated bisphenol A) phenyl tetraphenyl xylylene tetra (pentaerythritol) octaphosphite, di (hydrogenated bisphenol A) di (isodecyl (tetraphenyl xylylene tetra (pentaerythritol) octaphosphite, tetra (di (4-hydroxycyclohexyl) methyl ethyl methane) tetraphenyl xylylene tetra (pentaerythritol) octaphosphite, tetra (di (4-hydroxycyclohexyl) methane) tetraphenyl xylylene tetra (pentaerythritol) octaphosphite, tetra (di (4-hydroxycyclohexyl) tetraphenyl xylylene tetra (pentaerythritol) octaphosphite, tetra (bis (2-hydroxycyclohexyl) dimethyl methane) tetraphenyl xylylene tetra (pentaerythritol) octaphosphite, tetra (1,4-di-hydroxycyclohexane) tetraphenyl xylylene tetra (pentaerythritol) octaphosphite, tetra (di (4-hydroxycyclohexyl) sulfone) tetraphenyl xylylene tetra (pentaerythritol) octaphosphite, tetra (phenyl) tetraphenyl xylylene tetra (pentaerythritol) octaphosphite, tetra (p-nonylphenyl) tetraphenyl xylylene tetra (pentaerythritol) octaphosphite, tri (phenyl) p-nonpylphenyl tetraphenyl xylylene tetra (pentaerythritol) octaphosphite, tetra (stearyl) tetraphenyl xylylene tetra (pentaerythritol) octaphosphite, tetra (eicosanyl) tetraphenyl xylylene tetra (pentaerythritol) octaphosphite, tetra (oleyl) tetraphenyl xylylene tetra (pentaerythritol) octaphosphite, tetra (octyl) tetraphenyl xylylene tetra (pentaerythritol) octaphosphite, tetra (3,5-dichlorophenyl) tetraphenyl xylylene tetra (pentaerythritol) octaphosphite, diethyl di (phenyl) xylylene tetra (pentaerythritol) octaphosphite, tetra (2,4-dinonylphenyl) tetraphenyl xylylene tetra (pentaerythritol) octaphosphite.

The compounds of the present invention in general are colorless solids. They are useful as heat and light stabilizers and antioxidants.

They can be readily ground for incorporation in an amount of 0.01 to 20% into various polymers such as halogen containing resins, e.g. vinyl chloride resins, as stabilizers against heat and light, or as antioxidants. They are particularly useful in stabilizing rigid polyvinyl chloride resins where many other phosphites are unsuitable.

Examples of halogenated polymers which can be stabilized with the phosphites of the present invention include chlorinated polyethylene having about 14 to about 75%, e.g. 27% chlorine, polyvinyl chloride, polyvinylidene chloride, polyvinyl bromide, polyvinyl fluoride, polyvinylidene fluoride, polytetrafluoroethylene, copolymers of vinylidene chloride with acrylonitrile (e.g. 80:20) or vinyl chloride (e.g. 85.15), copolymers of vinyl chloride with 1 to 90%, preferably 1 to 40%, by weight of copolymerizable materials such as vinyl acetate, vinylidene chloride, vinylidene fluoride, diethyl fumarate, diethyl maleate and other alkyl fumarates and maleates, vinyl propionate, methyl acrylate, ethyl acrylate, butyl acrylate, 2-ethylhexyl acrylate and other alkyl acrylates, methyl methacrylate, butyl methacrylate and other methacrylates, methyl alpha chloroacrylate, styrene, vinyl ethyl ether, vinyl methyl ketone, acrylonitrile, allylidene diacetate, trichloroethylene, etc. Typical copolymers include vinyl chloride-vinyl acetate (96:4), vinyl chloride-vinyl acetate (87:13), vinyl chloride-vinyl acetate-maleic anhydride (86:13:1), vinyl chloride-vinylidene chloride (95:5), vinyl chloride-diethyl fumarate (95:5), vinyl chloride-trichloroethylene (95:5), vinyl chloride-trichloroethylene (95:5), vinyl chloride-arylonitrile (60:40), vinyl chloride-2-ethylhexyl acrylate (80:20). They can also be used to stabilize resins where the halogen containing component is present in minor amount, e.g. acrylonitrile-vinyl chloride copolymer (85:15) or halogenated rubbers, e.g. polychloroprene, chlorinated polyisobutylene, chlorinated natural rubber, chlorine containing polyurethanes, etc.

As is conventional in the art when the novel phosphites are employed with halogen containing resins, there can be added barium, cadmium and zinc salts and synergistic activity is noted in this connection. Thus there can be included 0.5 to 10% of salts such as mixed barium-cadmium laurate, barium laurate, cadmium laurate, zinc stearate, cadmium 2-ethylhexoate, barium nonylphenolate, barium octylphenolate, barium stearate, zinc octoate.

There can also be incorporated in the vinyl chloride resins and the like 0.5 to 10% of organotin compounds, particularly sulfur containing compounds such as dibutyltin bis (octylthioglycollate).

Conventional phenolic antioxidants can also be incorporated in an amount of 0.1 to 10%, e.g. 2,2-methylene bis (4-methyl-6-t-butylphenol), 2,4,6 - tri-t-butylphenol, 4,4'-isopropylidenephenol, etc.

The novel phosphites of the present invention can also be incorporated in an amount of 0.01 to 20% as stabilizers for hydrocarbon polymers, including mono-olefin polymers such as polyethylene, polypropylene, ethylene propylene copolymers (e.g. 80:20, 50:50, 20:80), ethylene-propylene terpolymers, e.g. ethylene-propylene cyclooctadiene terpolymer, ethylenebutene-1 copolymer, ethylene-decene-1 copolymer, polystyrene, polyolefin, e.g. diolefin polymers such as natural rubber, rubbery butadiene styrene copolymer (75:25, 60:40) cis isoprene polymer, polybutadiene, polyisobutylene, isobutylene-butadiene copolymer (butyl rubber, e.g. 97:3, 98.5:1.5). There can also be stabilized ABS rubbers and resins (acrylonitrile-butadiene-styrene terpolymers, e.g. 50:40:10).

They can be used in an amount of 0.01 to 20% to stabilize polyurethanes, (e.g. from toluene diisocyanate and polypropylene glycol molecular weight 2025), polyesters, e.g. Dacron (polyethylene terephthalate), polymeric tetramethylene terephthalate-isophthalate-sebacate, or unsaturated polyesters, e.g. ethylene glycol-propylene glycol adipate-maleate molecular weight 5000 and the corresponding polymer modified with 10% styrene, nylon, e.g. polyhexamethylene adipamide, Delrin (polymerized oxymethylene) and Celcon (oxymethylene copolymer), polyvinyl butyral, polysulfones from conjugated diolefins, sulfur dioxide and a monoethylenically unsaturated compound, e.g. a terpolymer of butadiene, sulfur dioxide and styrene as set forth in Example 1 of Mostert Pat. 3,377,324, polycarbonate, e.g. the reaction product of bisphenol A with phosgene or diphenyl carbonate as well as other polycarbonates set forth in Fritz Pat. 3,305,520.

When incorporated in hydrocarbon polymers, it is frequently advantageous to add conventional phenolic antioxidants as set forth above and conventional additives such as dilauryl thiodipropionate.

They are also useful as stabilizers for foods, oils, lubricants, and other products which deteriorate on oxidation.

The compounds of the invention are also useful as flame and fire proofing additives in polyurethane, hydrocarbon polymers, cellulose esters and ethers, e.g. cellulose acetate, methyl cellulose, ethyl cellulose, cellulose acetate-propionate, etc.

The field of greatest utility at the moment, however, appears to be as stabilizers for rigid vinyl chloride resins. Since the compounds of the present invention are monomeric with readily defined structures, it is surprising that they will act as stabilizers for rigid vinyl chloride resins since the only phosphites previously found to satisfactorily stabilize rigid polyvinyl chloride are polymeric phosphites. The rigid polyvinyl chloride resins normally do not contain over 10% plasticizer and can be completely devoid of plasticizer.

Unless otherwise indicated, all parts and percentages are by weight. As used in the specification, the "moles" are gram molecular weights.

EXAMPLE 1

1 mole of 1,1,3-tri (4-hydroxyphenyl) propane, 3 moles of diphenyl pentaerythritol diphosphite and 10 grams of diphenyl phosphite were subjected to vacuum distillation until 3 moles of phenol were removed. The product remaining in the pot was tris (phenyl) triphenylpropane tris (pentaerythritol) hexaphosphite, a low melting solid.

EXAMPLE 2

1 mole of 1,1,3-tri (4-hydroxyphenyl) propane, 3 moles of di (isodecyl) pentaerythitol diphosphite and 14 grams of di (isodecyl) phosphite were subjected to vacuum distillation at 10 mm. until 3 moles of isodecyl alcohol were removed. The product remaining in the pot was tris (isodecyl) triphenylpropane tris (pentaerythritol) hexaphosphite, a low melting solid.

EXAMPLE 3

1 mole of 1,1,5,5-tetra (4-hydroxyphenyl) pentane, 4 moles of diphenyl pentaerythritol diphosphite and 10 grams of diphenyl phosphite were subjected to vacuum distillation at 10 mm. until 4 moles of phenol were removed. The product remaining in the pot was tetra (phenyl) tetraphenylpentane tetra (pentaerythritol) octaphosphite, a colorless solid.

EXAMPLE 4

1 mole of 1,1,5,5-tetra (4-hydroxyphenyl) pentane, 4 moles of di (octyl) pentaerythritol diphosphite and 11 grams of dioctyl phosphite were subjected to vacuum distillation at 10 mm. until 4 moles of octyl alcohol were removed. The product remaining in the pot was tetra (octyl) tetraphenylpentane tetra (pentaerythritol) octaphosphite, a low melting solid.

EXAMPLE 5

1 mole of 1-(di(4'-hydroxphenyl)) methyl-4-(di (4-hydroxyphenyl)) methyl benzene, 4 moles of diphenyl pentaerythritol diphosphite and 14 grams of diphenyl phosphite were subjected to vacuum distillation at 10 mm. until 4 moles of phenol were removed. The residue remaining in the pot was tetra (phenyl) tetraphenyl xylylene tetra (pentaerythritol) octaphosphite, a low melting solid.

EXAMPLE 6

To 1 mole of the product of Example 1 and 10 grams of diphenyl phosphite there were added 3.1 moles of hydrogenated Bisphenol A and the mixture heated in a vacuum at 10 mm. until 3 further moles of phenol were removed (6 moles of phenol in all were removed). The solid residue in the pot was tris (hydrogenated Bisphenol A) triphenylpropane tris (pentaerythritol) hexaphosphite.

EXAMPLE 7

To 1 mole of the product of Example 1 and 10 grams of diphenyl phosphite there were added 2 moles of hydrogenated Bisphenol A and the mixture heated in a vacuum at 10 mm. until 2 further moles of phenol were removed. The solid residue in the pot was di(hydrogenated Bisphenol A) phenyl triphenylpropane tris (pentaerythritol) hexaphosphite.

EXAMPLE 8

To 1 mole of the product of Example 1 and 10 grams of diphenyl phosphite there were added 3 moles of p-nonylphenol and the mixture heated in a vacuum at 10 mm. until 3 further moles of phenol were removed. The solid residue in the pot was tris (p-nonylphenyl) triphenylpropane tris (pentaerythritol) hexaphosphite.

EXAMPLE 9

To 1 mole of the product of Example 4 and 10 grams of dioleyl phosphite there were added 4 moles of oleyl alcohol and the mixture heated in a vacuum at 10 mm. until 4 further moles of octyl alcohol were removed. The solid residue in the pot was tetra (oleyl) tetraphenylpentane tetra (pentaerythritol) octaphosphite.

EXAMPLE 10

1 mole of 1,1,3-tri (4-hydroxyphenyl) propane, 3 moles of dimethyl pentaerythritol diphosphite and 7 grams of sodium methylate were heated under a vacuum until 3 moles of methyl alcohol were removed. To the tris (methyl) triphenylpropane tris (pentaerythritol) hexaphosphite residue in the pot there was added 3.1 moles of stearyl alcohol and the mixture heated in a vacuum at 10 mm. until 3 further moles of methyl alcohol were removed. The solid residue in the pot was tris (stearyl) triphenylpropane tris (pentaerythritol) hexaphosphite.

EXAMPLE 11

To 1 mole of the product of Example 4 and 11 grams of dioctyl phosphite there were added 4.1 moles of hydrogenated Bisphenol A and the mixture heated in a vacuum at 10 mm. until 4 further moles of octyl alcohol were removed (8 moles of octyl alcohol were thus removed, including that in Example 4). The solid residue in the pot was tetra (hydrogenated bisphenol A) tetraphenylpentane tetra (pentaerythritol) octaphosphite.

EXAMPLE 12

To 1 mole of the product of Example 5 and 14 grams of diphenyl phosphite there were added 4.1 moles of hydrogenated bisphenol A and the mixture heated in a vacuum at 10 mm. until 4 further moles of phenol were removed (8 moles of phenol were thus removed, including that in Example 5). The solid residue in the pot was tetra (hydrogenated bisphenol A) tetraphenyl xylylene tetra (pentaerythritol) octaphosphite.

EXAMPLE 13

| | Parts |
|---|---|
| Type 1 rigid polyvinyl chloride (QYSJ) | 100 |
| Calcium-zinc stearate (1:1 mixture) | 2 |
| Epoxidized soyabean oil | 3 |
| Stearic acid (processing aid) | 0.5 |
| Phosphite of Example 6 | 0.8 |

This mixture was extruded in the form of a parison and a bottle blow molded therefrom. The bottle was water white and perfectly clear and showed good heat and light stability.

Similar results were obtained when (a) the phosphite prepared in Example 11 and (b) the phosphite prepared in Example 12 were substituted for the phosphite prepared in Example 6 in the procedure of Example 13.

EXAMPLE 14

2 parts of the phosphite prepared in Example 6, 1 part of dioleyl thiodipropionate and 1 part of 2,2-methylene bis (4-methyl-6-t-butyl-phenol) were mixed with 100 parts of polypropylene (melt index 0.8) to give a stabilized product.

EXAMPLE 15

2 parts of the phosphite prepared in Example 6 and 1 part of 4,4'-isopropylidene diphenol were milled into 100 parts of SBR rubber (60% butadiene-40% styrene) to give a stabilized product.

What is claimed is:

1. A phosphite having one of the formulae (1) 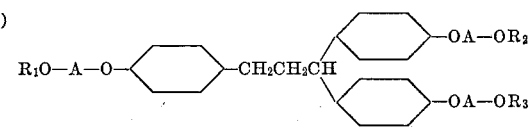

and (2) 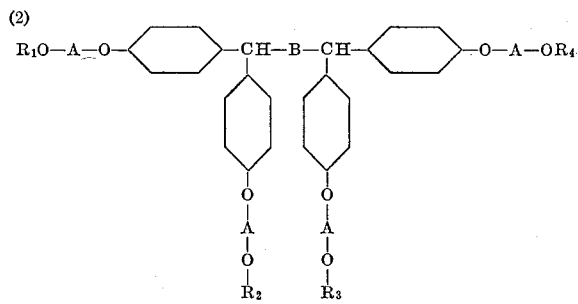

where A is

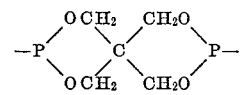

B is $(CH_2)_n$ or

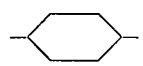

where $n$ is an integer from 0 to 10, $R_1$, $R_2$, $R_3$ and $R_4$ are selected from the group consisting of alkyl having 1 to 20 carbon atoms, alkenyl of 3 to 18 carbon atoms, phenyl, alkyl phenyl where the alkyl group has 1 to 18 carbon atoms, allyl phenyl, halo phenyl and the monovalent residue of a dihydric phenol or hydrogenated dihydric phenol by removing one of the hydroxy groups, said dihydric phenol or hydrogenated dihydric phenol having 1 to 2 rings, any substituent on the rings being hydrogen, alkyl of 1 to 4 carbon atoms or chloro, any link between two rings being $(X)_n$ where X is O, S, $SO_2$ or

where $R_7$ and $R_8$ are hydrogen, lower alkyl, or phenyl and $n$ is zero or one.

2. A phosphite according to claim 1 having Formula 1.
3. A phosphite according to claim 2 where at least a part of the R groups are hydrogenated dihydric phenol residues.
4. A phosphite according to claim 3 wherein all of the R groups have the formula

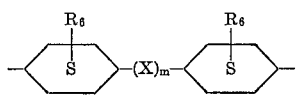

where $R_6$ is hydrogen or 1 to 4 carbon atom alkyl, X is O, S, SO$_2$, or

where $R_7$ and $R_8$ are hydrogen, lower alkyl or phenyl and $m$ is zero or one.

5. A phosphite according to claim 4 wherein $R_1$ through $R_4$ are all residues of 4,4'-isopropylidene dicyclohexanol.

6. A phosphite according to claim 1 having Formula 2.

7. A phosphite according to claim 6 wherein B is $(CH_2)_n$.

8. A phosphite according to claim 7 wherein at least a part of the R groups are hydrogenated dihydric phenol residues.

9. A phosphite according to claim 8 wherein $n$ is 3.

10. A phosphite according to claim 9 wherein all of the R groups have the formula

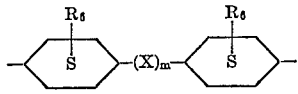

wherein $R_6$ is hydrogen or 1 to 4 carbon atom alkyl, X is O, S, SO$_2$, or

where $R_7$ and $R_8$ are hydrogen, lower alkyl or phenyl and $m$ is zero or one.

11. A phosphite according to claim 10 wherein $R_1$ through $R_4$ are all residues of 4,4'-isopropylidene dicyclohexanol.

12. A phosphite according to claim 6 wherein B is

13. A phosphite according to claim 12 wherein at least a part of the R groups are hydrogenated dihydric phenol residues.

14. A phosphite according to claim 13 wherein all of the R groups have the formula

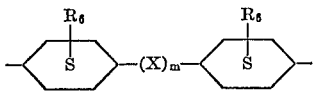

where $R_6$ is hydrogen or 1 to 4 carbon atom alkyl, X is O, S, SO$_2$ or

where $R_7$ and $R_8$ are hydrogen, lower alkyl or phenyl and $m$ is zero or one.

15. A phosphite according to claim 14 wherein $R_1$ through $R_4$ are all residues of 4,4'-isopropylidene dicyclohexanol.

References Cited
UNITED STATES PATENTS

| | | | |
|---|---|---|---|
| 3,262,999 | 7/1966 | Friedman | 260—927 |
| 3,283,037 | 11/1966 | Davis | 260—927 |
| 3,310,609 | 3/1967 | Baranauckas et al. | 260—927 |

CHARLES B. PARKER, Primary Examiner

R. L. RAYMOND, Assistant Examiner

U.S. Cl. X.R.

260—45.95